US006784980B2

(12) United States Patent
Sumi et al.

(10) Patent No.: US 6,784,980 B2
(45) Date of Patent: Aug. 31, 2004

(54) THERMAL DEVELOPMENT APPARATUS AND IMAGE RECORDING APPARATUS

(75) Inventors: Makoto Sumi, Sayama (JP); Akira Taguchi, Sayama (JP)

(73) Assignee: Konica Corporation, Tokyo (JP)

( * ) Notice: Subject to any disclaimer, the term of this patent is extended or adjusted under 35 U.S.C. 154(b) by 0 days.

(21) Appl. No.: 10/633,559

(22) Filed: Aug. 5, 2003

(65) Prior Publication Data

US 2004/0027548 A1 Feb. 12, 2004

(30) Foreign Application Priority Data

Aug. 8, 2002 (JP) ....................................... 2002-231198

(51) Int. Cl.[7] .......................... G03B 27/00; G03B 27/52

(52) U.S. Cl. .......................................... 355/405; 355/40

(58) Field of Search ............................... 355/27, 40–41, 355/405, 407; 347/101–103; 399/69, 320; 219/216

(56) References Cited

U.S. PATENT DOCUMENTS 6,400,446 B1 * 6/2002 Kashino et al. ............. 355/405
6,672,719 B2 * 1/2004 Sumi et al. ................. 347/103

* cited by examiner

*Primary Examiner*—Henry Hung Nguyen
(74) *Attorney, Agent, or Firm*—Finnegan, Henderson, Farabow, Garrett & Dunner, L.L.P.

(57) ABSTRACT

A thermal development apparatus for developing a thermal development film, having a heating section, which has at least a partially cylindrical surface for transporting and heating the film and plural parallel pressing rollers to press the film onto the cylindrical surface. When "P" denotes the pitch with which the pressing rollers are provided, and "l" denotes the shortest distance between the leading or trailing edge of the effective image area and the leading or the trailing edge of the film, the relationship of l>P is satisfied.

9 Claims, 4 Drawing Sheets

THERMAL DEVELOPMENT APPARATUS AND IMAGE RECORDING APPARATUS

BACKGROUND OF THE INVENTION

The present invention relates to a thermal development apparatus and an image recording apparatus utilizing the thermal developing apparatus.

1. Prior Art

In an image recording apparatus such as a laser imager, image data input from a medical imaging device such as a radiographing apparatus and MRI are subjected to an image processing such as a gradation processing, and a heat development film (referred to as film hereinafter) is scanned by a laser beam based on the image data having been subjected to image processing to form a latent image on the film. After that, the film on which a latent image is formed is heated and developed to record a visible image on the film.

A thermal developing apparatus heats the film and conducts development by transporting the film in close contact to the outer peripheral surface of a drum-shaped heating section of the apparatus. Herein, in order to obtain a high quality image, it is necessary to ensure stable close contact of the film with the heating section. To achieve this, plural pressing rollers are arranged parallel to each other along the outer peripheral surface of the heating section with a prescribed pitch, and the film is transported with a condition of being nipped between the pressing rollers and the heating section. During this, the film is made in close contact with the peripheral surface of the heating section due to being pressed by the pressing rollers.

Further, in the image recording apparatus, in order to compensate for image quality fluctuation caused by ambient environmental fluctuation, and aged deterioration of the image recording apparatus and the film, etc., in the course of forming a latent image on the film a prescribed amount of laser is irradiated on a part of the film to form a compensation standard area (a density patch). The image recording apparatus measures the density of the density patch area after development by the thermal development apparatus, compensates image data to be used for forming the next latent images, and determines laser irradiation amount, based on the measured density and the predetermined target density of the density patch.

2. Problems to be Solved by the Invention

In cases where the film is transported under close contact with the outer peripheral surface of the heating section, almost all portions of the film are pressed by the pressing rollers to form a stable contact condition, however, at the leading edge portion and the trailing edge portion the contact becomes unstable because edges of the films are not pressed all the time by the pressing rollers. For this reason, the film flip-flops at the top end portion and the trailing edge portion depending on the peripheral surface curvature of the heating section and the inherent elastic force of the film. In cases where the film flip-flops, the film may float up from the peripheral surface of the heating section and may not receive sufficient heat for development, resulting in degradation or fluctuation of the density as generated as shown in FIG. 5. These unstable areas extend into the effective image area that is necessary for diagnosis and the like, and the area that can be actually used for diagnosis is narrowed.

Incidentally, if the density patch N is positioned inside the effective image area, the diagnosis can possibly be disturbed by the density patch N, therefore, the density patch is usually provided outside the effective image area. However, if the density patch N is provided at the leading edge portion or trailing edge portion of the film, due to the above-explained flip-flops of the film, the density of the density patch itself can be degraded or fluctuate. When the density of the density patch whose density is unstable is measured, correct compensation can not be conducted, and as a result, the finishing quality of the film F to be image recorded thereafter will worsen and image quality in the effective image area will also fluctuate.

Objectives of the present invention are to provide a heat developing apparatus and an image recording apparatus that suppress degradation and fluctuation of the image quality in the effective image area.

SUMMARY OF THE INVENTION

The objectives of the present invention can be attained by the following structures.

(1) A thermal development apparatus for developing a film for thermal development, comprising:

a heating section, which has at least a partially cylindrical surface at an outer peripheral portion of the heating section, for transporting the film while heating the film being brought into contact with the partially cylindrical surface;

a plurality of pressing rollers provided in parallel with each other along with a transportation path of the film, which is transported along the partially cylindrical surface of the heating section, for pressing the film onto the partially cylindrical surface of the heating section;

wherein when "R" denotes the curvature radius of the partially cylindrical surface, "r" denotes the radius of each of the plurality of pressing rollers, "α (degrees)" denotes an angle between two neighboring axial centers of the plurality of pressing rollers with respect to the center of the curvature radius of the partially cylindrical surface, and "P" denotes the pitch with which the plurality of pressing rollers are provided; the following expressions are satisfied;

$$P=2\pi R\alpha/360,$$

$$P>2r$$

wherein, when "l" denotes the shortest distance between the leading or trailing edge of the effective image area recorded on the film and the leading or the trailing edge of the film; the relationship of l>P is satisfied.

According to the structure (1), since the radius "r", the angle "α", and the pitch "P" are established such that "l>P" is satisfied, even if the leading edge portion or the trailing edge portion of the film flip-flops during the development process, at least the effective image area is effectively pressed by the pressing rollers onto the outer peripheral surface of the heating section. Therefore, in the development process the effective image area can be stably provided heat to prevent the deterioration or fluctuation density areas from encroaching into the effective image area, and image quality degradation or fluctuation can be reduced.

(2) The thermal development apparatus according to the structure (1), characterized in that the surface material of the plurality of pressing rollers is comprised of rubber or a rubber-like material.

According to the structure (2), since the surface material of the plurality of pressing rollers is comprised of rubber or a rubber-like material, when the pressing rollers press the film for thermal development onto the partially cylindrical peripheral surface of the heating section, the surface material of the pressing rollers elastically deforms to make area-contacts of the film with the partially cylindrical peripheral surface. In the case of line-contact of the two, since the film is pressed at lines, the leading edge and the trailing edge portion are apt to flip-flop. However in the case of structure (2), since the film and the heating section are brought into area-contact, the flip-flops at the leading edge and the trailing edge portion can be suppressed.

Further, in cases where the surface material of the pressing rollers is elastically deformed, the distance between neighboring pressed areas is reduced to shorter than the predetermined pitch, and an area broader than the effective image area can be pressed onto the outer peripheral surface of the heating section. By this action, the degradation or fluctuation of the image quality can be suppressed in an area broader than the effective image area.

(3) The thermal development apparatus according to the structure (2), characterized in that hardness (JIS-A) of the surface material of the plurality of pressing rollers is in the range of 20 to 60 degrees.

If the hardness of the surface material is greater than 60 degrees, since it does not sufficiently deform and contacting area of the material onto the film is restricted to small, it is not easy to suppress the flip-flops at the leading edge and trailing edge portion of the film. In the present invention, hardness (JIS-A) of the surface material of the plurality of pressing rollers is in the range of 20 to 60 degrees, therefore, the surface material effectively deforms to suppress the flip-flops at the leading edge and trailing edge portion of the film.

(4) An image recording apparatus comprising:

a laser scanning apparatus for forming a latent image on a film for thermal development by scanning the film with a laser beam; and a thermal development apparatus for developing the latent image formed on the film by heating the film;

wherein in the course of forming the latent image, the laser scanning apparatus forms a compensation standard area at a prescribed position on the film by irradiating the film with a prescribed amount of laser irradiation, wherein the thermal developing apparatus comprises:

a heating section, which has at least a partially cylindrical surface at an outer peripheral portion of the heating section, for transporting and heating the film while the film being brought into contact with the partially cylindrical surface;

a plurality of pressing rollers provided in parallel with each other along the transportation path of the film, which is transported along the partially cylindrical surface of the heating section, for pressing the film onto the partially cylindrical surface of the heating section;

wherein when "R" denotes the curvature radius of the partially cylindrical surface, "r" denotes the radius of each of the plurality of pressing rollers, "α (degrees)" denotes the angle between two neighboring axial centers of the plurality of pressing rollers with respect to the center of the curvature radius of the partially cylindrical surface, and "P" denotes the pitch with which the plurality of pressing rollers are provided; the following expressions are satisfied;

$$P=2\pi R\alpha/360,$$

$$P>2r$$

wherein, when "L" denotes the shortest distance between the leading or trailing edge of the compensation standard area formed on the film and the leading or the trailing edge of the film; the relation of L>P is satisfied.

According to the structure (4), since the radius "r", the angle "α", and the pitch "P" are established such that "L>P" is satisfied, even if the leading edge portion or the trailing edge portion of the film flip-flops during the development process, the compensation standard area is pressed by the pressing rollers onto the peripheral surface of the heating section. Therefore, in the development process the compensation standard area can be stably provided heat to prevent deteriorated or fluctuated density areas caused by the flip-flops from encroaching into the compensation standard area. Therefore, the compensation standard area after development shows stable density, and by conducting compensation based on this stable density, the finishing quality of images on the film to be subsequently recorded can be stablilized and degradation and fluctuation of the image quality in the effective image area can be suppressed.

(5) The image recording apparatus according to the structure (4), further comprises a density measurement device for measuring the density at the compensation standard area, and the image recording apparatus compensates the amount of laser irradiation based on the difference between the measured density by the density measurement device and the target density of the compensation standard area.

According to the structure (5), since the amount of laser irradiation is compensated based on the difference between the measured density by the density measurement device and the target density of the compensation standard area, the compensation relating to environmental fluctuation and aged deterioration of the image recording apparatus or the film can be stably performed.

DETAILED DESCRIPTION OF THE PREFERRED EMBODIMENT

The embodiment of the present invention will be explained with reference to FIGS. 1 to 4.

An image recording apparatus shown as an example of the embodiment is an image recording apparatus such as a laser imager, which utilizes a dry-silver halide thermal development system.

Figure 1:
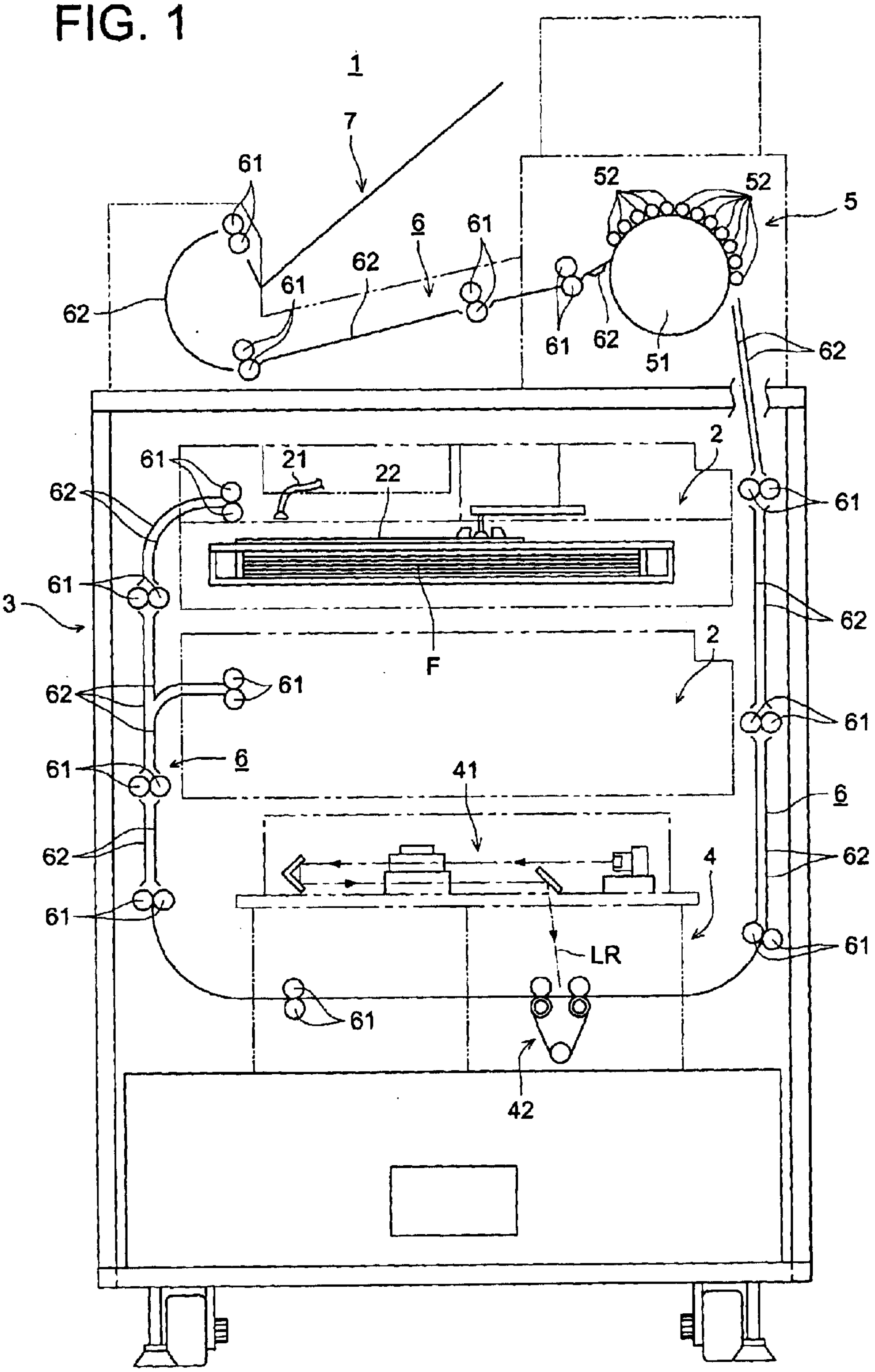
FIG. 1 is a sectional side view showing the main structure of the image recording apparatus of the present embodiment.
Figure 2:
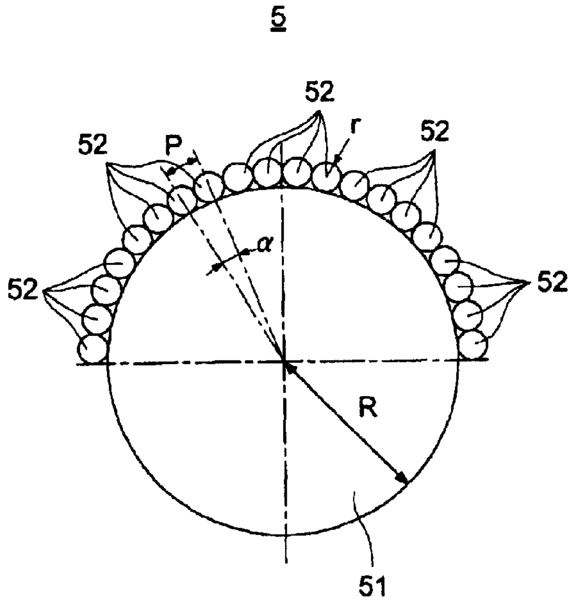
FIG. 2 is a schematic side view showing the thermal development apparatus provided in the image recording apparatus shown in FIG. 1.

In this image recording apparatus, as shown in FIG. 1, film housing 2 is retractably provided with an upper and lower stage at the middle section in casing 3. Under the film housing 2 in the casing 3, laser scanning apparatus 4 for scanning the film F with a laser beam to form a latent image is provided, and above the film housing 2 a thermal development apparatus 5 is provided for heat-developing the film on which the latent image is formed. In the casing 3, a film transport route 6 having plural paired transporting rollers 61 and plural paired guide rails 62 is provided for transporting the film from the film housing 2 through the laser scanning apparatus 4 to the thermal development apparatus 5 and thereafter carrying out the film from the casing 3. These sub-systems are controlled by a control section (not illustrated). Above the casing 3, an exit tray 7 is provided for receiving the film carried out from the casing 3.

Above the film housing 2, a suction disc 21 is provided for sucking and transporting the film into the film transport route 6. The suction disc 21 transports the uppermost sheet of plural sheets of stacked film in the film housing 2. Further, above the film housing 2 a protection cover 22 is provided to prevent exposure and deterioration of the film F in the standby state. In the standby state, the protection cover 22 is closed to hermetically seal the film housing 2, and for the transport state the protection cover is opened to enable the suction disc to transport the film. Incidentally, illustration for the film housing 2 in the lower stage is omitted.

In the laser scanning apparatus 4, a scanning optics section 41 including a laser source, a polygon mirror, Fθ lens, cylindrical lens is provided and a film moving section 42 for moving the film with a prescribed moving rate is also provided just under the scanning optics section 41.

The laser scanning apparatus 4 scans the film F with laser LR to form a latent image of the person based on the image data obtained by photographing the person being tested using an appropriate medical imaging apparatus such as a radiographing apparatus and MRI (Magnetic Resonance Imaging) Tomography apparatus. In such medical imaging apparatus, usually a region of person being diagnosed is photographed, and the image region necessary for a diagnosis must be developed on the film at least with stable image quality. For this reason, in the image recording apparatus 1 of the present embodiment, an effective image area is established based on at least a necessary region for the diagnosis in the image area photographed with the medical imaging apparatus. The effective image area is an area where image density is stable and image quality is high enough without causing any inconvenience at the time of diagnosis. For example, as in the case of the present embodiment, when the image recorded on the film is a medical image, the effective image area is defined as to include at least the region capable of responding to the diagnosis.

The laser scanning apparatus 4 forms a latent image of a test person necessary for diagnosis in the effective image area on the film F. At this time, the laser scanning apparatus 4 forms a latent image of a compensation standard area (a density patch etc.) by irradiating a prescribed amount of laser LR onto a prescribed position outside the effective image area on the film F.

In the thermal developing apparatus 5, a cylindrically shaped heating drum 51 is provided for heating and developing the latent image formed film F. In a developing process, the heating drum 51 rotates on its center axis to transport the film F while heating it. The surface material of the heating drum 51 is rubber or rubber-like material, and has a heat resistant property at least durable enough to tolerate the heating temperature of the heating drum 51.

The surface material of the heating drum 51 is a rubber or a rubber-like material including various kinds of materials having the similar kind of elasticity as the rubber material, as well as various kinds of rubber materials and thermoplastic elastomers. For example, various rubber materials, resin materials, and thermoplastic materials can be used by themselves or in combination. In this case the various rubber materials are not meant to be restricted, but for example, a liquid reaction hardened material obtained by hardening a liquid viscoelastic material may be used other than solid rubber materials.

The solid rubber materials include for example, materials obtained by vulcanization (or cross-linkage) by mixing the appropriate agents, which are conventionally used in the rubber industry, such as vulcanization or cross-linking agents, vulcanization accelerating agents, vulcanization accelerating aids, adhesive adding agents, filling agents, plastitizers, antioxidant agents, and solvents, etc., with polymers used separately or in combination such as ethylene-propylene ternary copolymer (EPDM), butyl rubber, polyisobutylene, ethylene-propylene rubber, chloroprene rubber, natural rubber, styrene-butadiene rubber, butadiene rubber, styrene-isoprene-styrene, styrene-butadiene-styrene, urethane rubber, etc.

The liquid rubber materials include, for example, urethane, liquid polybutadiene, degenerated silicone, silicone, polysulfide, etc. These materials are preferably used after hardening by adding a prescribed amount of hardening agent and mixing them for reaction. The structure of the rubber materials or the rubber-like materials can be formed as a dense state or a spongy state as well.

In the present embodiment, as the surface material of the heating drum 51, silicone rubber, which contains thermo-conductive particles such as iron oxide, and a dehydrating agent such as silica gel, is used. And the silicone rubber is formed to have a hardness (JIS-A) not higher than 70 degrees. (The hardness of the silicone rubber used in the present invention is 60 degrees.)

On the outer peripheral surface of the heating drum 51, plural rotatable pressing rollers 52 are provided parallel to each other along with the transporting path of the film F which is transported by the heating drum 51. By these pressing rollers 51, the film F is pressed onto the outer peripheral surface of the heating drum 51. With the rotation of the heating drum 51 the film F is transported, and when the leading edge of the film F has reached the position of the last pressing roller, the film F is separated by a separating claw (not illustrated) from the outer peripheral surface of the heating drum 51 and transported into the film transport route 6. The surface material of the pressing rollers 52 is a rubber or a rubber-like material, and has a heat resistant property at least durable to tolerate the heating temperature of the heating drum 51.

The surface material of the pressing rollers 52 is a rubber or a rubber-like material including various kinds of materials having similar kind of elasticity as the rubber material, as well as various kinds of rubber materials and thermoplastic elastomers. For example, various rubber materials, resin materials, and thermoplastic materials can be used separately or in combination. In this case the various rubber materials are not meant to be restricted, but for example, other than solid rubber materials, a liquid reaction hardened material obtained by hardening a liquid viscoelastic material may also be used.

The solid rubber materials include for example, materials obtained by vulcanization (or cross-linkage) by mixing the agents, which are conventionally used in the rubber industry, such as vulcanization or cross-linking agents, vulcanization accelerating agent, vulcanization accelerating aid, adhesive adding agents, filling agents, plastitizers, antioxidant agents, and solvents, etc., with polymers used separately or in combination such as ethylene-propylene ternary copolymer (EPDM), butyl rubber, polyisobutylene, ethylene-propylene rubber, chloroprene rubber, natural rubber, styrene-butadiene rubber, butadiene rubber, styrene-isoprene-styrene, styrene-butadiene-styrene, urethane rubber, etc.

The liquid rubber materials include, for example, urethane, liquid polybutadiene, degenerated silicone, silicone, polysulfide, etc. These materials are preferably used after hardening by adding prescribed amounts of hardening agents and mixing for reaction. The structure of the rubber materials or the rubber-like materials can be formed as a dense state or a spongy state as well.

In the present embodiment, as the surface material of the pressing rollers 52, a silicone rubber, which contains thermo-conductive particles such as iron oxide and a dehydrating agent such as silica gel, is used. And the silicone rubber is formed to have a hardness (JIS-A) in the range from 20 to 60 degrees.

In order to prevent degradation or fluctuation of the film density in the effective image area, dimensions of each part in the thermal development apparatus 5 is set to satisfy the following expressions. (Refer to FIG. 2)

$$P=2\pi R\alpha/360,$$

$$P>2r$$

$$l>P,$$

$$L>P$$

Wherein, "R" denotes the curvature radius of the cylindrical heating drum 51, "r" denotes the radius of the pressing rollers, "α" (deg) denotes the angle between two neighboring axial centers of the pressing rollers with respect to the axial center of the cylindrical heating drum 51, "P" denotes the pitch at which the plural pressing rollers are provided, "l" denotes the shorter distance of the distance between leading edge of the effective image area recorded on the film F and the leading edge of the film F or the distance between the trailing edge of the effective image area and the trailing edge of the film F, and "L" denotes the shorter distance of the distance between leading edge of the compensation standard area recorded on the film F and the leading edge of the film F or the distance between the trailing edge of the compensation standard area and the trailing edge of the film F.

Figure 3:
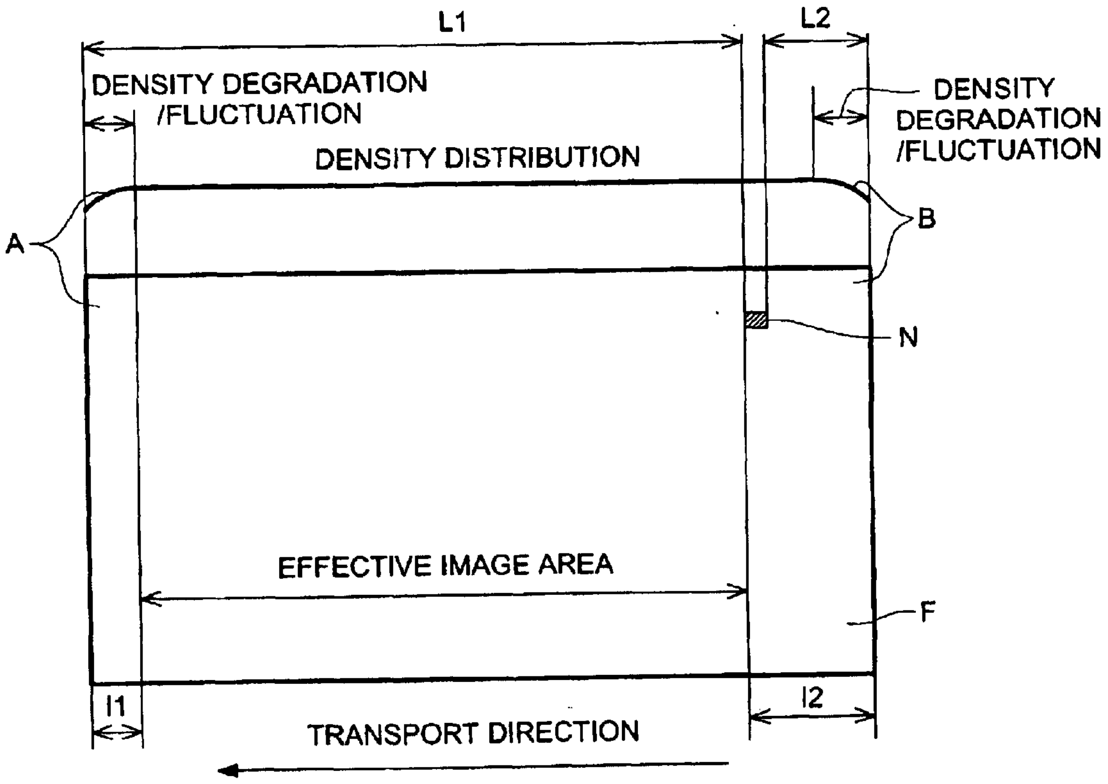
FIG. 3 is an illustration explaining each area and density distribution on the film developed by the thermal development apparatus shown in FIG. 2.

After the development of the film F, it is desirable that the image quality is stable over the entire area of the film F, however, in the course of development when the leading edge of the film F (the leading side in the transporting direction: left side in FIG. 3) or the trailing edge of the film F (back side in the transporting direction: right side in FIG. 3) is positioned in between two neighboring pressing rollers the leading edge portion A and the trailing edge portion B of the film F do not closely contact onto the surface of the drum 51 but flip-flops to cause degradation or fluctuation of film density in such a manner as clearly shown in the density distribution of FIG. 3.

The effective image area is established to have as large an area as possible, namely l1 and l2 are made as short as possible, to the extent that the leading edge portion A or the trailing edge portion B does not overlap the effective image area. Incidentally, in the embodiment shown in FIG. 3, l2 is larger than l1, namely l=l1, therefore, by making the pitch "P", the radius "r" of the pressing roller, and the angle "α" to correspond to l1, degradation or fluctuation of the density in the effective image area can be prevented.

In cases where the outer radius R of the heating drum 51 becomes smaller, the degree of curvature of the peripheral surface becomes larger, and it becomes difficult to prevent the flip-flops of the film edge. Therefore, the pitch "P", the radius "r" and the angle "α" are necessary to be established to satisfy the above-mentioned relations. When the radius R of the heating drum 51 becomes larger, the degree of curvature becomes smaller and it becomes rather easy to suppress the flip-flops of the film F, however, the larger heating drum leads to an undesirably large sized apparatus and increased manufacturing cost. However, by establishing each dimensions of the thermal developing apparatus to satisfy the above-mentioned expressions, the image quality within the effective image area can be improved, while minimizing size and cost of the apparatus.

Similarly, when the compensation standard area is formed at the leading edge portion A or the trailing edge portion B of the film F, the density at the compensation standard area becomes unstable, and by using the unstable density value of the compensation standard area correct compensation cannot be performed. Further if the compensation standard area is formed in the effective image area, the compensation standard area obstructs the image observation of the effective image area. If l2 is set with consideration of the compensation standard area as shown in FIG. 3, the compensation standard area (density patch N) is not formed in the effective image area, nor is formed in the portion where the leading edge portion or the trailing edge portion of the film F flip-flops.

Since, L is the shorter distance of the distance L1 between leading edge of the compensation standard area recorded on the film F and the leading edge of the film F or the distance L2 between the trailing edge of the compensation standard area and the trailing edge of the film F, in the present embodiment L=L2.

Incidentally, in the present embodiment, the case is shown where one compensation standard area is arranged at the trailing edge portion of the film F. In cases where compensation standard area is respectively arranged at each of the leading edge portion and the trailing edge portion of the film F, L is the shorter distance of the distance between the leading edge of the compensation standard area arranged at the leading edge portion of the film F and the leading edge of the film F or the distance between the trailing edge of the compensation standard area arranged at the trailing edge portion of the film F and the trailing edge of the film F. Further in cases where plural compensation standard areas are arranged at the leading edge portion or at the trailing edge portion of the film F, L is defined to be the shortest distance between the leading edge or the trailing edge of the compensation standard area and the leading edge or the trailing edge of the film F.

At the film transport route 6 downstream the thermal development apparatus 5, a densitometer (density measurement means: not illustrated) to measure the density of the compensation standard area formed on the film F is provided, and while the developed film F passes along the film transport route 6 the density of the compensation area is measured by the densitometer.

Figure 4:
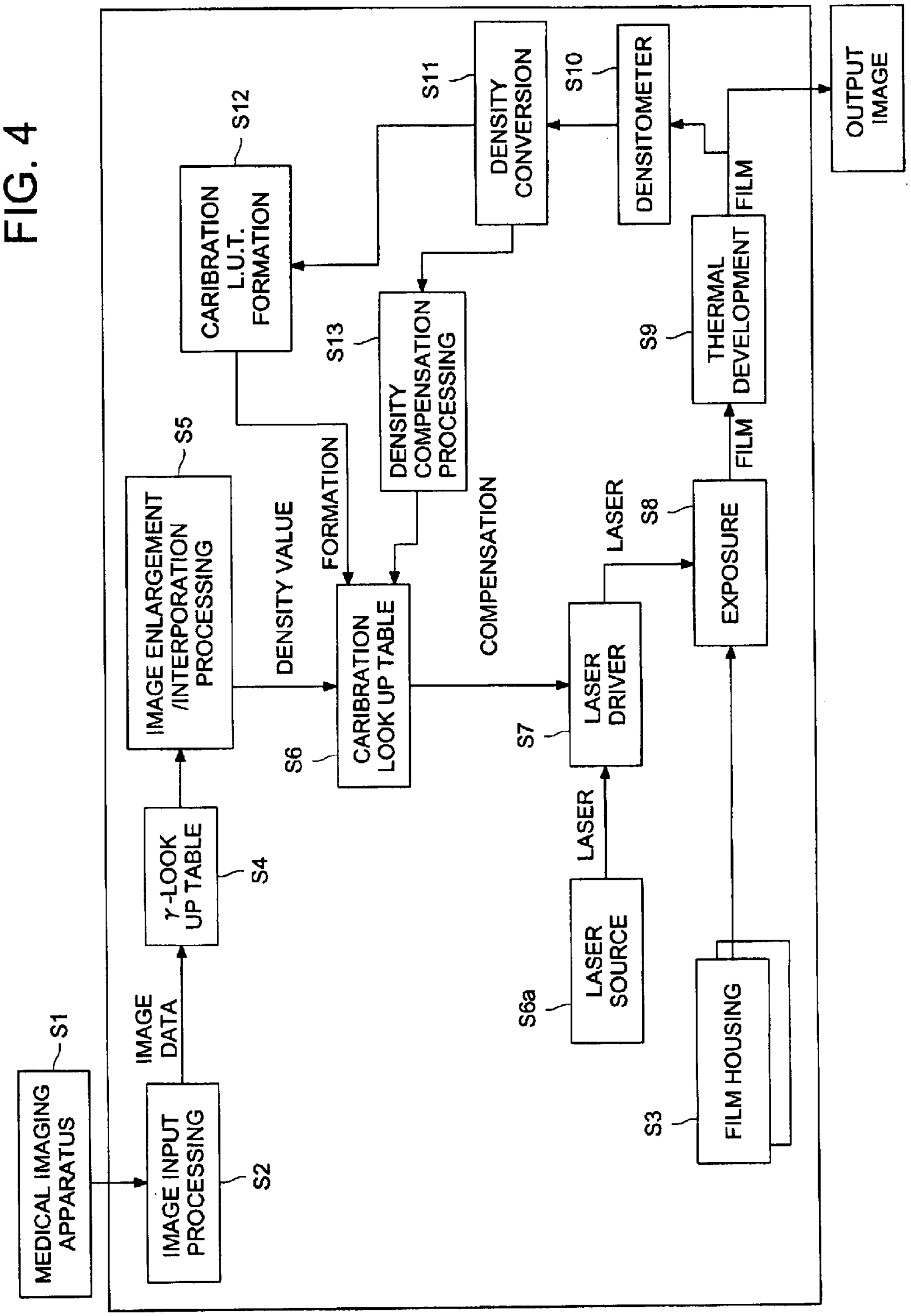
FIG. 4 is a flow diagram showing each operation in the course of recording an image by the image recording apparatus shown in FIG. 1.
Figure 5:
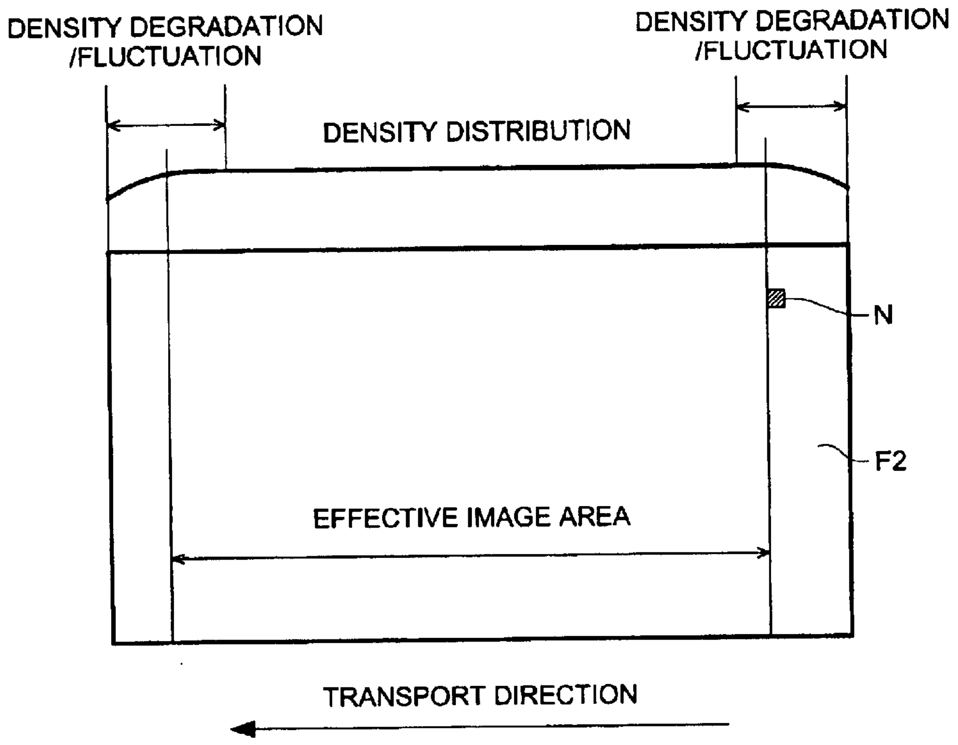
FIG. 5 is an illustration explaining each area and density distribution on the film developed by a conventional thermal development apparatus.

Next, referring to the flow diagram of FIG. 4, operations in the course of recording a image on the film F will be explained for each section of the image recording apparatus of the present embodiment.

When image data is input into the image recording apparatus 1 from a medical imaging apparatus (Step S1), the image data is performed input-processing (Step S2) and transformed into the format that can be treated by the laser scanning apparatus 4, and is input to the laser scanning apparatus 4.

Meanwhile, film F stored in the film housing 2 is transported through the film transport route 6 into the laser scanning apparatus 4 (Step S3).

In the laser scanning apparatus 4, the image data is converted to density value data based on a γ-Look Up Table, whereby the image data is converted to density data (Step S4). After that, the laser scanning apparatus subjects the converted density value data to image enlargement/interpolation processing and forms the density value data, that is actually to be used for exposing the film F, by interpolating the density value in the necessary area (Step S5).

After completing the interpolation and formation of the density value data, the laser scanning apparatus 4 transforms the density value data based on a Calibration Look Up Table, which is made by taking into account the aged deterioration of the image recording apparatus 1 and the film F (Step S6). The transformed density value data is then input into the laser driver in the scanning optics section 41 (Step S7).

Here, the laser driver determines the amount of laser LA irradiation based on the density value data (Step S6a).

Laser scanning apparatus 4 forms a latent image by exposing the film F transported from the film housing 2 with the determined irradiation amount of laser LR (Step S8). At this time, a latent image for the compensation standard area (density patch N in FIG. 3) is formed outside the effective image area on the film F by exposing an irradiation amount of laser LR corresponding to a predetermined density value in a Look Up Table.

When the film F, on which a latent image is formed, is transported to the thermal development apparatus 5, the heating drum 51 heats and develops the film F pressed by the pressing rollers 52 for close contact onto the outer peripheral surface of the heating drum (Step S9). After that, while the film F is transported from the thermal development apparatus to the exit tray 7, a densitometer measures the density of the compensation standard area (density patch N) and inputs the measured data into the laser scanning apparatus 4 (Step S10).

When the measured data of the density patch N is input from the densitometer, the laser scanning apparatus 4 performs a density conversion processing to form each density data of the density patch N (Step S11).

The laser scanning apparatus 4 forms a calibration Look Up Table based on the density data of the density patch N by taking account of environmental fluctuations and aged deterioration (Step S12). Further, the laser scanning apparatus 4 calculates density compensation values based on the density data of the density patch N by applying a density compensation processing (Step S13), and forms the calibration Look Up Table, which is to be used in Step S6 for the next image recording cycle by applying the density compensation value calculated in the Step S13 on the calibration Look Up Table formed in the Step S12. Herewith, a laser irradiation amount to be used for the next image recording cycle is determined by taking account the environmental fluctuations and aged deterioration. According to the above-mentioned process, an irradiation amount of the laser scanning apparatus 4 is compensated based on the difference between the density measured by the densitometer and the target density of the compensation standard area.

As described above, according to the image recording apparatus 1 of the present embodiment, since the radius r the angle "α", and the pitch "P" are determined to satisfy the relation: L>P, and l>P, even if the leading edge portion or the trailing edge portion of the film F flip-flops in the course of development, the effective image area and the compensation standard area are pressed to the outer peripheral surface of the heating drum 51. Namely, during development, it is possible to stably provide heat to the effective image area and to the compensation standard area, and to prevent the density degradation or fluctuation from encroaching into the effective image area or the compensation standard area. Therefore, the image quality degradation can be suppressed. Further, the compensation standard area after development exhibits stable density, and by performing a compensation based on this density, finished image quality of the film F to be recorded thereafter can be stabilized, and the image quality degradation or fluctuation can be effectively suppressed.

Further, since the surface material of the pressing rollers is a silicone rubber formed so that the hardness (JIS-A) is within the range of 20 to 60 degrees, when the pressing rollers press the film F onto the outer peripheral surface of the heating drum 51, the silicone rubber deforms to make an area-contact between the film F and the surface of the heating drum 51. Since film F is pressed to make an area-contact, the flip-flops of the leading edge portion or the trailing edge portion can be suppressed. Further, when the silicone rubber, which is the surface material of the pressing rollers 52, is deformed, the distance between the pressed areas of neighboring pressing rollers 52 becomes smaller than the predetermined pitch of the pressing rollers 52, therefore, an area broader than the effective image area can be effectively pressed onto the outer peripheral surface of the heating drum 51. Thereby, the image quality degradation or fluctuation can be suppressed over a broader area than the effective image area.

If the hardness of the surface material of the pressing rollers 52 is greater than 60 degrees, since it does not sufficiently deform and contacting area of the material to the film is restricted, it is not easy to suppress the flip-flops at the leading edge and trailing edge portion of the film.

If the hardness of the surface material is less than 20 degrees, positioning of the pressing rollers 52 becomes unstable, and smooth transportation of the leading edge of the film F into the nip portion between the pressing rollers 52 and the heating drum 51 tends to be destabilized.

In the present invention, hardness (JIS-A) of the surface material of the pressing rollers 52 is in the range of 20 to 60 degrees, therefore, the surface material preferably deforms to suppress the flip-flops at the leading edge and trailing edge portion of the film F, and to ensure the smooth transportation of the film F.

Needless to say, the present invention is not restricted to the above-described embodiment, but is possible to be appropriately changed. For example, in the present embodiment as for the heating section, a fully cylindrical shaped heating drum 51 is exemplified, however, the heating section is possible to be utilized if at least a portion of the outer peripheral surface is cylindrical. If the heating portion has a partially cylindrical surface portion, dimensions of each part of the thermal development apparatus can be established to satisfy the above-described formulaic expressions. In this case, "R" represents the curvature radius of the partially cylindrical surface, and "α" represents the angle between two neighboring axial centers of the pressing rollers with respect to the center of the curvature radius of the partially cylindrical surface.

Effects of the Invention

According to the structure (1) of the invention, even if the leading edge portion or the trailing edge portion of the film flip-flops during the development process, at least the effective image area is pressed by the pressing rollers onto the outer peripheral surface of the heating section. Therefore, in the development process the effective image area can be stably heated to prevent the degraded or fluctuated density areas from encroaching into the effective image area, and image quality degradation or fluctuation can be suppressed.

According to the structure (2) of the present invention, when the pressing rollers press the film for thermal development onto the partially cylindrical peripheral surface of the heating section the surface material of the pressing rollers elastically deform to make area-contact between the film and the partially cylindrical peripheral surface. In the case of linear contact of the two, since the film is pressed in lines across the width of the film, the leading edge and the trailing edge portion are apt to flip-flop. However in the case of structure (2), since the film and the heating section are brought into area-contact, the flip-flops at the leading edge and the trailing edge portion can be suppressed.

Further, in cases where the surface materials of the pressing rollers are elastically deformed, the distance between neighboring pressed areas is reduced to less than the predetermined pitch, and an area broader than the effective image area can be pressed to the outer peripheral surface of the heating section. By this means, the image quality degradation or fluctuation can be suppressed in an area broader than the effective image area.

According to the structure (3) of the present invention, the surface material preferably deforms to suppress the flip-flops at the leading edge and trailing edge portion of the film.

According to the structure (4) of the present invention, even if the leading edge portion or the trailing edge portion of the film flip-flops during the development process, the compensation standard area is pressed by the pressing rollers onto the peripheral surface of the heating section. Therefore, in the development process the compensation standard area can be stably heated to prevent deteriorated or fluctuated density area caused by the flip-flops from encroaching into the compensation standard area. Therefore, the compensation standard area after development exhibits a stable density, and by conducting compensation based on this stable density, a finished image quality on the film thereafter can be stabilized and degradation and fluctuation in the effective image area can be suppressed.

According to the structure (5) of the present invention, since the amount of laser beam irradiation is compensated for based on the difference between the measured density by the density measurement device and the target density of the compensation standard area, the compensation related to environmental fluctuation and the aged deterioration of the image recording apparatus or the film can be stably performed.

What is claimed is:

1. A thermal development apparatus for developing a film for thermal development, comprising:

a heating section, which has at least a partially cylindrical surface on an outer peripheral portion of the heating section, for transporting and heating the film being brought into contact with the partially cylindrical surface;

a plurality of pressing rollers provided in parallel with each other along a transportation path of the film, which is transported along the partially cylindrical surface of the heating section, for pressing the film onto the partially cylindrical surface of the heating section;

wherein, when "R" denotes the curvature radius of the partially cylindrical surface, "r" denotes the radius of each of the plurality of pressing rollers, "α (degrees)" denotes the angle between two neighboring axial centers of the plurality of pressing rollers with respect to the center of the curvature radius of the partially cylindrical surface, and "P" denotes the pitch with which the plurality of pressing rollers are provided; the following expressions are satisfied;

$$P=2\pi R\alpha/360,$$

$$P>2r$$

wherein, when "l" denotes the shortest distance between the leading or trailing edge of the effective image area recorded on the film and the leading or the trailing edge of the film; the relationship of l>P is satisfied.

2. The thermal development apparatus of claim 1, wherein the surface material of the plurality of pressing rollers is comprised of rubber or a rubber-like material.

3. The thermal development apparatus of claim 1, wherein hardness (JIS-A) of the surface material of the plurality of pressing rollers is in the range of 20 to 60 degrees deforms to suppress the flip-flops at the leading edge and trailing edge portion of the film.

4. An image recording apparatus comprising:

a laser scanning apparatus for forming a latent image on a film for thermal development by scanning the film with a laser beam; and a thermal development apparatus for developing the latent image formed on the film by heating the film;

wherein in the course of forming the latent image, the laser scanning apparatus forms a compensation standard area at a prescribed position on the film by irradiating the film with a prescribed amount of laser irradiation, wherein the thermal developing apparatus comprises:

a heating section, which has at least a partially cylindrical surface on an outer peripheral portion of the heating section, for transporting and heating the film being brought into contact with the partially cylindrical surface;

a plurality of pressing rollers provided in parallel with each other along a transportation path of the film, which is transported along the partially cylindrical surface of the heating section, for pressing the film onto the partially cylindrical surface of the heating section;

wherein, when "R" denotes the curvature radius of the partially cylindrical surface, "r" denotes the radius of each of the plurality of pressing rollers, "α (degrees)" denotes the angle between two neighboring axial centers of the plurality of pressing rollers with respect to the center of the curvature radius of the partially cylindrical surface, and "P" denotes the pitch with which the plurality of pressing rollers are provided; the following expressions are satisfied;

$$P=2\pi R\alpha/360,$$

$$P>2r$$

wherein, when "l" denotes the shortest distance between the leading or trailing edge of the effective image area recorded on the film and the leading or the trailing edge of the film; the relationship of l>P is satisfied.

5. The image recording apparatus of claim 4, further comprising a density measurement device for measuring the density at the compensation standard area, and the image recording apparatus compensates the amount of laser irradiation based on the difference between the measured density by the density measurement device and the target density of the compensation standard area.

6. The image recording apparatus of claim 4, wherein the surface material of the plurality of pressing rollers is comprised of rubber or a rubber-like material.

7. The image recording apparatus of claim 4, wherein hardness (JIS-A) of the surface material of the plurality of pressing rollers is in the range of 20 to 60 degrees.

8. The image recording apparatus of claim 5, wherein the surface material of the plurality of pressing rollers is comprised of rubber or a rubber-like material.

9. The image recording apparatus of claim 5, wherein the hardness (JIS-A) of the surface material of the plurality of pressing rollers is in the range of 20 to 60 degrees.

* * * * *